April 7, 1936.                L. B. HENDERSON                2,036,939
         MEANS FOR OPERATING AND SECURING WINDOWS, DOORS AND THE LIKE
                  Filed July 27, 1935         2 Sheets-Sheet 1

L. B. Henderson
Inventor

By: Glascock Downing & Seebold
Attys.

April 7, 1936.   L. B. HENDERSON   2,036,939
MEANS FOR OPERATING AND SECURING WINDOWS, DOORS AND THE LIKE
Filed July 27, 1935   2 Sheets-Sheet 2

L. B. Henderson
Inventor

By: Glascock Downing & Seebold
Attys.

Patented Apr. 7, 1936

2,036,939

UNITED STATES PATENT OFFICE 2,036,939

MEANS FOR OPERATING AND SECURING WINDOWS, DOORS, AND THE LIKE

Leonard Bayliffe Henderson, Oldbury, Birmingham, England, assignor to Accles and Pollock Limited, Birmingham, England Application July 27, 1935, Serial No. 33,576
In Great Britain August 11, 1934

3 Claims. (Cl. 268—117)

This invention has for its object to provide improved means for opening or closing and securing pivoted windows, doors, flaps and the like, and more particularly the pivoted windows of motor vehicles.

The invention comprises the combination of a main lever having at one end a pivotal connection with an attachment piece, a finger lever pivoted on the main lever, and a pin and slot connection between the finger lever and the attachment piece, the arrangement being such that rotation of the finger lever produces a rotational movement of the main lever which can serve to effect opening or closing of the window, door or the like.

In the two accompanying sheets of explanatory drawings:—

Figure 1:
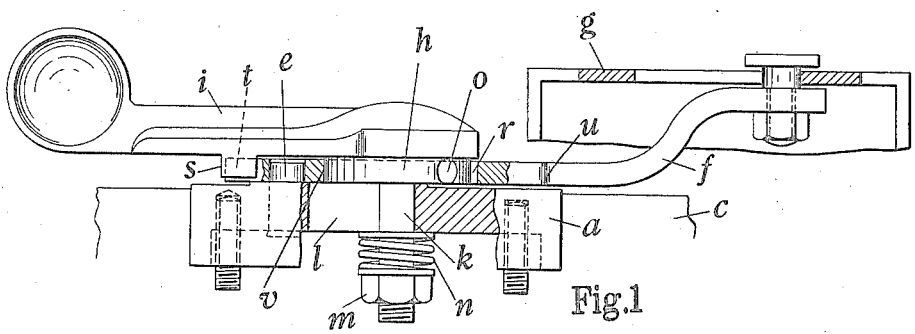
Figure 1 is a part sectional side view, Figure 2 a part sectional end view, and Figure 3 a plan of operating and securing means constructed in accordance with the invention and applied to a pivoted window of a motor vehicle, the window being shown in the closed position.
Figure 2:
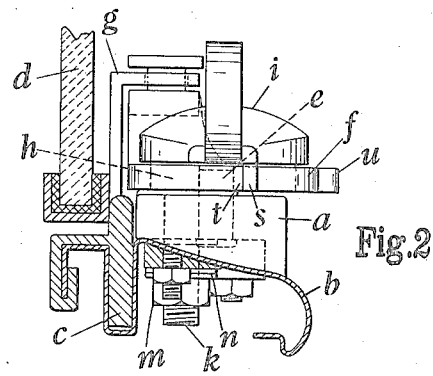
Figure 3:
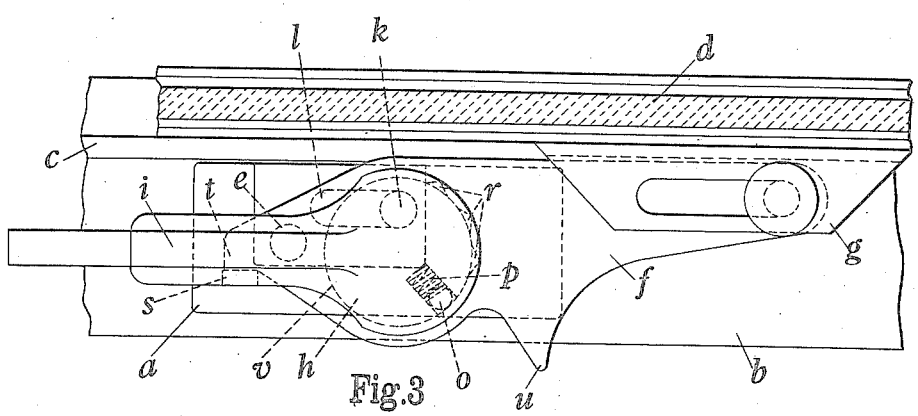
Figure 4:
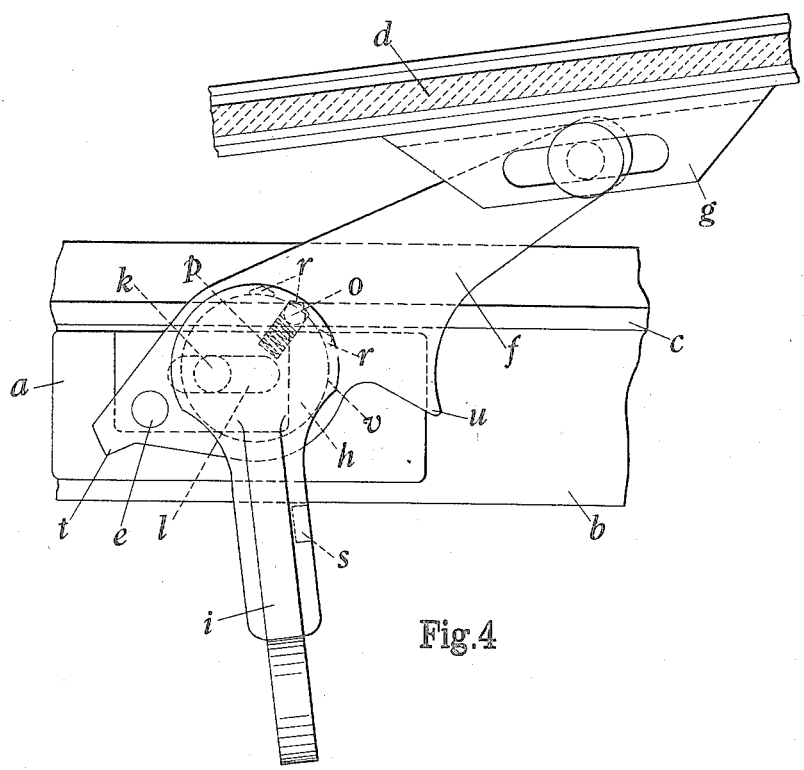
Figure 4 is a plan of the said means and showing the window in a partially open position.

In carrying the invention into effect as shown, I employ an attachment piece $a$ adapted to be secured to a beading $b$ formed integrally with the fixed frame $c$ of a pivoted motor vehicle window $d$. On the piece $a$ is pivoted by means of a pin $e$ one end of a part $f$ herein termed the main lever, the other end of which is adapted to engage a slotted or channelled member $g$ on the window $d$. In the main lever $f$ is formed a circular aperture $v$ adapted to receive a disc or boss $h$ provided on one side of another lever $i$ herein termed the finger lever. A pin $k$ extending eccentrically from the disc or boss $h$ passes through a slot $l$ in the attachment piece $a$ and is fitted at its outer end with a nut $m$, a spring or spring washer $n$ being preferably interposed between the nut $m$ and the underside of the attachment piece $a$. By means of the pin and slot connection between the finger lever $i$ and attachment piece $a$, rotation of the lever $i$ produces rotational movement of the main lever $f$ about its pivot $e$, and, due to the slidable connection between the outer end of the main lever $f$ and the member $g$ this movement is able to effect the desired opening or closing of the window $d$.

The arrangement of the pin and slot connection relatively to the pivot axes of the two levers $f$, $i$ is such that the window $d$ is positively locked in either the fully open or the closed position.

Preferably, means are also provided for holding the window in the partially open position. In the example shown this is effected by a ball $o$ carried in a recess in the side of the boss $h$ and acted upon by a spring $p$ which serves to press the ball $o$ into engagement with any one of a number of notches $r$ formed in the wall of the aperture $v$ so as to hold the window $d$ in any one of a number of partially open positions. Or a screw device may be combined with the pin $k$ for locking the levers $f$, $i$, in any desired intermediate relationship. Alternatively a friction washer may be interposed between the spring $n$ and the underside of the attachment piece $a$. Further the washer and the adjacent surface of the attachment piece $a$ may be adapted by an indentation and projection on the respective parts to augment the securing action in the intermediate positions of the window.

To limit the relative movements of the levers $f$, $i$ they may be provided with interengageable stops. In the example shown the finger lever $i$ is formed with a projection $s$ adapted, in the closed position of the window $d$, to engage a tail $t$ on the main lever $f$, and in the fully open position of the window $d$ to engage a projecting part $u$ formed on the lever $f$.

The invention is not limited to the example above described as subordinate details of construction or arrangement may be varied to suit different requirements. Further if more convenient the attachment piece $a$ may be mounted on the window, door or the like, in which case the sliding connection at the outer end of the main lever $f$ is provided on the fixed frame.

Having thus described my invention what I claim as new and desire to secure by Letters Patent is:—

1. In means for operating and securing windows, doors and the like, the combination of an attachment piece, a main lever having at one end a pivotal connection with the attachment piece, a circular aperture in the main lever for receiving a boss provided on one side of a finger lever, and a pin extending eccentrically from the boss and passing through a slot in the attachment piece, substantially as described.

2. In means for operating and securing pivoted windows, doors and the like, the combination of a main lever having at one end a pivotal connection with an attachment piece, a finger lever mounted for rotation on the main lever about an axis displaced from the axis of said pivotal connection, and pin and slot connection between the finger lever and the attachment piece eccentric to the axis of rotation of the finger lever whereby rotation of the finger lever produces a rotational movement of the main lever which can serve to effect opening or closing of the window, door or the like.

3. Operating and securing means as claimed in claim 2, in which the main lever is formed with a circular aperture for receiving a boss provided on one side of the finger lever, a pin extending eccentrically from the boss and passing through a slot in the attachment piece, substantially as described.

LEONARD BAYLIFFE HENDERSON.